(12) United States Patent
Frashure et al.

(10) Patent No.: US 8,892,326 B2
(45) Date of Patent: Nov. 18, 2014

(54) ELECTRONIC CONTROL UNIT CONFIGURATION TOOL

(75) Inventors: Timothy J. Frashure, Columbia Station, OH (US); Ron R. Stahl, Medina, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 291 days.

(21) Appl. No.: 13/269,779

(22) Filed: Oct. 10, 2011

(65) Prior Publication Data
US 2013/0090820 A1 Apr. 11, 2013

(51) Int. Cl.
*B60T 8/17* (2006.01)
*G06F 19/00* (2011.01)
*B60T 8/88* (2006.01)

(52) U.S. Cl.
CPC ........... *B60T 8/885* (2013.01); *B60T 2270/413* (2013.01)
USPC .......... 701/70; 701/29.3; 701/29.4; 701/29.6; 701/102; 701/115; 340/545.6

(58) Field of Classification Search
CPC ........................................................ G06F 9/06
USPC ........... 701/70, 29, 29.6, 102, 115, 29.3, 29.4
See application file for complete search history.

(56) References Cited

U.S. PATENT DOCUMENTS

| | | | |
|---|---|---|---|
| 5,890,086 A | 3/1999 | Wellman et al. | |
| 6,114,952 A | 9/2000 | Francesangeli et al. | |
| 6,127,947 A * | 10/2000 | Uchida et al. | 340/999 |
| 6,957,136 B2 | 10/2005 | Tachibana et al. | |
| 7,131,005 B2 | 10/2006 | Levenson et al. | |
| 7,274,977 B2 | 9/2007 | Frashure | |
| 7,366,589 B2 * | 4/2008 | Habermas | 701/1 |
| 7,501,946 B2 * | 3/2009 | Lanigan et al. | 340/545.6 |
| 7,693,612 B2 * | 4/2010 | Bauchot et al. | 701/1 |
| 7,970,496 B2 | 6/2011 | Koepf et al. | |
| 7,996,140 B2 * | 8/2011 | Stewart et al. | 701/102 |
| 8,265,854 B2 * | 9/2012 | Stewart et al. | 701/102 |
| 2002/0035429 A1 * | 3/2002 | Banas | 701/115 |
| 2003/0158638 A1 * | 8/2003 | Yakes et al. | 701/22 |
| 2003/0158640 A1 * | 8/2003 | Pillar et al. | 701/33 |

(Continued)

FOREIGN PATENT DOCUMENTS

WO     2009021825     2/2009

OTHER PUBLICATIONS

"Bendix Remote Diagnostic Unit (RDU)," Bendix Commercial Vehicle Systems LLC (2 pages) (copyright 2007).

*Primary Examiner* — Thomas G Black
*Assistant Examiner* — Wae Louie
(74) *Attorney, Agent, or Firm* — Reising Ethington P.C.

(57) ABSTRACT

A tool for configuring a replacement electronic control unit for a vehicle is provided. The tool includes a computer storage medium having a computer program encoded thereon which may be stored on an electronic module or installed on a computing device that connects to a communications bus in the vehicle. The program includes code for accessing a first memory associated with an original electronic control unit for the vehicle, retrieving a configuration for the original electronic control unit from the first memory, associating the configuration with a vehicle identification number associated with the vehicle in a second memory remote from the vehicle and downloading the configuration from the second memory to a third memory associated with the replacement electronic control unit for the vehicle.

26 Claims, 3 Drawing Sheets

(56) References Cited

U.S. PATENT DOCUMENTS

| | | | |
|---|---|---|---|
| 2004/0024502 A1* | 2/2004 | Squires et al. | 701/33 |
| 2008/0154712 A1* | 6/2008 | Wellman | 705/11 |
| 2009/0082879 A1* | 3/2009 | Dooley et al. | 700/3 |
| 2009/0089068 A1 | 4/2009 | McKibbon et al. | |
| 2009/0111520 A1* | 4/2009 | Ring | 455/557 |
| 2010/0156667 A1 | 6/2010 | Bennie et al. | |
| 2010/0301668 A1* | 12/2010 | Yakes et al. | 307/9.1 |
| 2011/0010073 A1* | 1/2011 | Stewart et al. | 701/102 |
| 2013/0090820 A1* | 4/2013 | Frashure et al. | 701/70 |

\* cited by examiner

ELECTRONIC CONTROL UNIT CONFIGURATION TOOL

BACKGROUND OF THE INVENTION

1. Field of the Invention

This invention relates to a tool and a method for configuring a replacement electronic control unit for a vehicle and, in particular, to a tool and method that facilitate configuration of replacement electronic control units without involvement by the original equipment manufacturer.

2. Discussion of Related Art

Modern vehicles rely extensively on electronic control systems to monitor and control a wide variety of vehicle systems and components including, for example, engines, fuel delivery systems, braking and stability control systems, and tire pressure management systems. Responsibility for the design and manufacture of many of these vehicle systems and components has been transferred over time from the vehicle manufacturers, or original equipment manufacturers (OEMs), to suppliers. For this and other reasons, many vehicle systems are designed today with individual electronic control units (ECUs) that form part of an overall vehicle control system.

The ECUs for various control systems are often designed for, and are capable of being used with, multiple types of vehicles. Upon assembly of the vehicle, the OEM configures the ECU by inputting parameter values (e.g., the length of the wheel base, turning radius, etc.) corresponding to the individual vehicle on which the ECU is being installed. The OEM maintains a record of these values associated with the particular vehicle (e.g., by association with a vehicle identification number (VIN)). If the ECU needs to be replaced during the life of the vehicle, the replacement ECU must again be configured for use with the vehicle on which the ECU will be installed. As a result, the owner of the vehicle, a vehicle repair service, or the supplier for the system must contact the OEM to obtain the record used to configure the original ECU. Obtaining this record from the OEM creates a significant delay in replacement of the ECU thereby increasing vehicle downtime and maintenance costs. Further, the OEM may be unwilling to provide the needed information to certain parties or unable to do so if the record is lost or misplaced.

The inventors herein have recognized a need for a tool and a method for configuring a replacement electronic control unit for a vehicle that will minimize and/or eliminate one or more of the above-identified deficiencies.

SUMMARY OF THE INVENTION

The present invention provides a tool and a method for configuring a replacement electronic control unit for a vehicle.

A tool for configuring a replacement electronic control unit for a vehicle in accordance with one embodiment of the invention includes a computer storage medium having a computer program encoded thereon. The storage medium may be housed, for example, in an electronic module or in conventional computing device configured for connection to the vehicle communications bus. The program includes code for accessing a first memory associated with an original electronic control unit for the vehicle and retrieving a configuration for the original electronic control unit from the first memory. The program further includes code for associating the configuration with a vehicle identification number associated with the vehicle in a second memory remote from the vehicle. The program further includes code for downloading the configuration from the second memory to a third memory associated with the replacement electronic control unit for the vehicle.

A method for configuring a replacement electronic control unit for a vehicle in accordance with one embodiment of the invention includes the steps of accessing a first memory associated with an original electronic control unit for the vehicle and retrieving a configuration for the original electronic control unit from the first memory. The method further includes the step of associating the configuration with a vehicle identification number associated with the vehicle in a second memory remote from the vehicle. The method further includes the step of downloading the configuration from the second memory to a third memory associated with the replacement electronic control unit for the vehicle.

A tool and method in accordance with the present invention are advantageous relative to conventional methods and systems for configuring replacement electronic control units in vehicles because the inventive tool and method eliminate the need to obtain information from the OEM for the vehicle. As a result, replacement ECUs can be installed much more quickly thereby reducing vehicle downtime and maintenance costs. The inventive tool and method also provide an additional backup system for the ECU configuration that may be controlled by the vehicle owner or another party to guard against the inability or unwillingness of the OEM to provide the information. The inventive tool and method are also advantageous in providing the supplier of the individual control system with control over the replacement (and resulting sales) of the electronic control unit.

These and other advantages of this invention will become apparent to one skilled in the art from the following detailed description and the accompanying drawings illustrating features of this invention by way of example.

DETAILED DESCRIPTION OF EMBODIMENTS OF THE INVENTION

Figure 1:
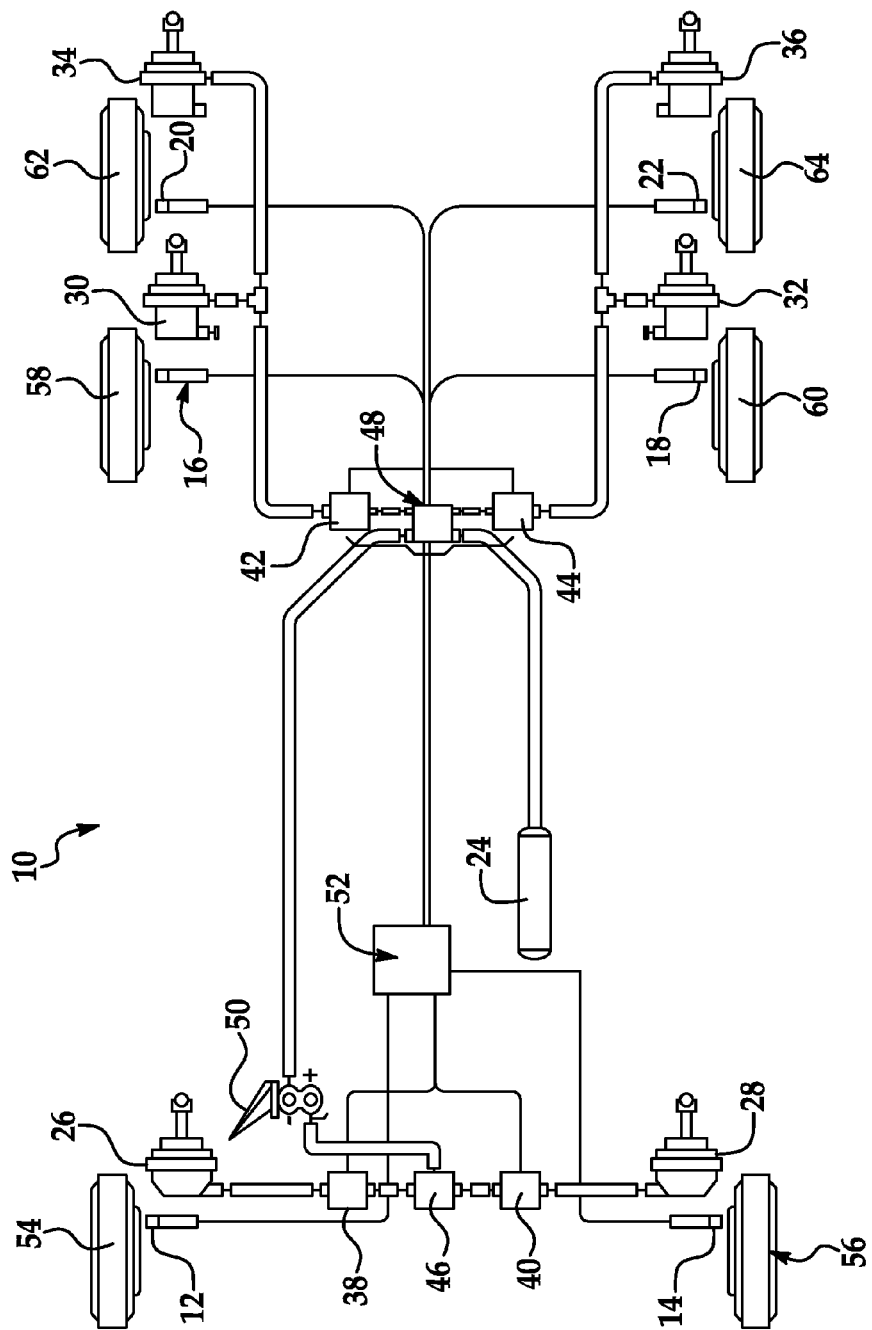
FIG. 1 is a diagrammatic view of a vehicle braking system.

Referring now to the drawings wherein like reference numerals are used to identify identical components in the various views, FIG. 1 illustrates a system 10 for braking and stability control of a commercial vehicle such as a tractor-trailer, truck or bus. Although a vehicle braking and stability control system 10 for a commercial vehicle is shown herein as one particular exemplary application of the invention, it should be understood that the invention disclosed herein could find application on a variety of vehicle control systems and vehicles. System 10 may include wheel speed sensors 12, 14, 16, 18, 20, 22, a fluid reservoir 24, brake actuators 26, 28, 30, 32, 34, 36, modulator valves 38, 40, 42, 44, traction relay valves 46, 48, service brake pedal valve 50, and an electronic control unit (ECU) 52.

Wheel speed sensors 12, 14, 16, 18, 20, 22 generate signals indicative of the speed of a corresponding wheel 54, 56, 58, 60, 62, 64 and are conventional in the art. Sensors 12, 14, 16, 18, 20, 22 may comprise magnetic sensors mounted on the vehicle proximate a toothed tone ring mounted for rotation with a corresponding wheel 54, 56, 58, 60, 62, 64. Movement of the teeth of the tone ring through a magnetic field generated by the sensor 12, 14, 16, 18, 20, 22 induces a current in the sensor 12, 14, 16, 18, 20, 22 that is proportional to the speed of the wheel 54, 56, 58, 60, 62, 64. Sensors 12, 14, 16, 18, 20, 22 provide signals to ECU 52 for use in antilock braking system (ABS), automatic slip regulation (ARS) and electronic stability control (ESC) functions.

Fluid reservoir 24 provides a source of compressed or pressurized fluid for the application of brakes by brake actuators 26, 28, 30, 32, 34, 36. Reservoir 24 is conventional in the art.

Brake actuators 26, 28, 30, 32, 34, 36 are provided to actuate braking components of conventional drum or disk brakes to apply a braking force to wheels 54, 56, 58, 60, 62, 64. Actuators 26, 28, 30, 32, 34, 36 are conventional in the art and are controlled by fluid pressure provided through a network of fluid conduits and valves including, for example, modulator valves 38, 40, 42, 44, traction relay valves 46, 48, and service brake pedal valve 50.

Modulator valves 38, 40, 42, 44 control the delivery of fluid pressure to, and the exhaust of fluid pressure from, the service brake chambers of actuators 26, 28, 30, 32, 34, 36. Valves 38, 40, 42, 44 are conventional in the art and may comprise one or more solenoids controlled in response to signals from ECU 52.

Traction relay valves 46, 48 provide several functions. Valves 46, 48 increase the volume of fluid, and therefore the speed, at which fluid is delivered to, and exhausted from, actuators 26, 28, 30, 32, 34, 36 when actuators 26, 28, 30, 32, 34, 36 are located at a relatively large distance from a fluid source such as reservoir 24 in order to eliminate lag times between the commanded and actual application and release of the brakes. Valves 46, 48 also provide traction control (differential braking) by providing controlled delivery of fluid to actuators 26, 28, 30, 32, 34, 36 during traction control events such as when the torque commanded by the driver is too great for given road surface conditions. Valves 46, 48 draw fluid from a fluid source such as reservoir 24. In response to a signal from ECU 52, traction relay valves 46, 48 permit fluid from a fluid source such as reservoir 24 to flow to appropriate modulator valves 38, 40, 42, 44 controlled by ECU 52 in order to actuate brakes. In the illustrated embodiment, a single integrated traction relay valve is used to perform the above-described functions. Alternatively, separate relay and traction valves could be employed and connected by a fluid conduit.

Service brake pedal valve 50 is provided to allow controlled application of the brakes by the vehicle operator by selectively releasing fluid pressure from a fluid reservoir such as reservoir 24. Pedal valve 50 is conventional in the art.

Electronic control unit (ECU) 52 is provided to control modulator valves 38, 40, 42, 44 and traction relay valves 46, 48 in order to provide antilock braking, automatic slip regulation and stability control functions. ECU 52 may comprise a programmable microprocessor or microcontroller. ECU 52 may include a central processing unit (CPU) and an input/output (I/O) interface through which ECU 52 may receive a plurality of input signals including signals generated by wheel sensors 12, 14, 16, 18, 20, 22 and other conventional sensors (not shown) such as a steering angle sensor, lateral acceleration sensor, yaw rate sensor and load sensor and generate a plurality of output signals including those used to control modulator valves 38, 40, 42, 44 and traction relay valves 46, 48.

Figure 2:
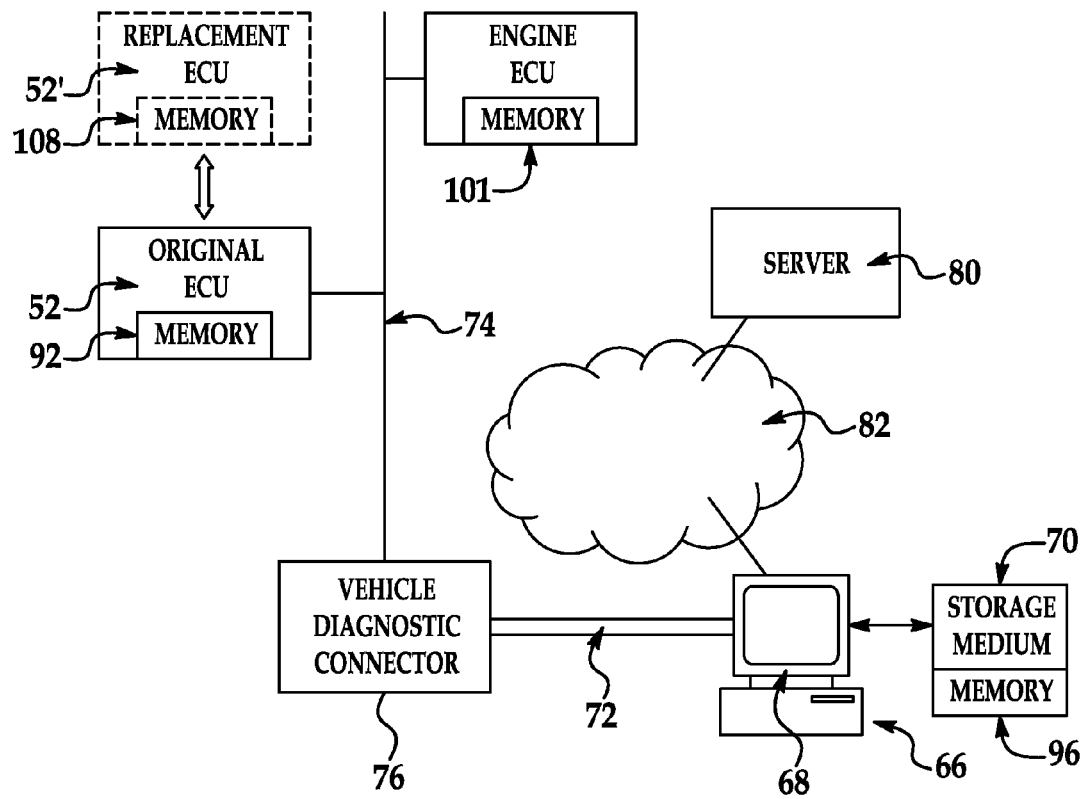
FIG. 2 is a diagrammatic view of a tool for configuring a replacement electronic control unit for a vehicle in accordance with one embodiment of the invention.

Referring now to FIG. 2, a tool 66 for configuring a replacement electronic control unit for a vehicle—such as a replacement ECU 52' for ECU 52—in accordance with one embodiment of the invention will be described. Tool 66 is provided to retrieve and store a configuration for a vehicle mounted ECU installed and configured by an OEM, such as ECU 52, and to configure a replacement ECU, such as ECU 52' in FIG. 2, using the same configuration. In the illustrated embodiment, tool 66 includes a computing device 68 configured to access a computer storage medium 70 and to process programming instructions or code (i.e. software) encoded thereon for performing several steps of a method in accordance with the invention described hereinbelow. Tool 66 further includes means, such as a conventional communications cable 72 for communicating with ECUs 52, 52' over a conventional serial communications link 74 within the vehicle through a diagnostic connector 76 mounted on the vehicle (typically in the cab of a truck such as on the dashboard).

Computing device 68 may comprise any of a variety of conventional computing devices capable of executing programming instructions from storage medium 70 including a personal computer, a handheld or tablet computer, a personal digital assistant (PDA), or a smartphone. Device 68 may include a central processing unit (CPU), memory, and an input/output (I/O) interface and a display (for example, an LED or LCD display).

Storage medium 70 may comprise any of a plurality of conventional computer components and recording media for storage of data including permanent or semi-permanent storage devices for computing device 68 such as memories or hard disk drives and portable storage devices such as flash drives or compact discs (CDs).

Communications cable 72 enables communication with ECUs 52, 52' over a conventional serial communications link 74 within the vehicle through a diagnostic connector 76 mounted on the vehicle (typically in the cab of a truck such as on the dashboard). Link 74 and connector 76 are conventional in the art any may be compliant with the automotive communications and diagnostic standards J1939 and/or J1708 and J1587 promulgated by the Society of Automotive Engineers (SAE). Connector 76 may comprise a conventional six or nine pin connector such as those offered for sale by the Deutsch Group of New York, N.Y. Cable 72 is conventional in the art and configured to mate with connector 76 and a corresponding connector on computing device 68. Cable 72 includes a plurality of wires and thereby provides a wired connection between device 68 and ECUs 52, 52' through link 74 and connector 76. It should be understood, however, that other means for communicating with ECUs 52, 52' over a link 74 and through connector 76 coupled be employed. For example, a wireless communications link could be established between device 68 and connector 76 using conventional wireless adapters for communications under any of a number of conventional wireless communication schemes (e.g., Bluetooth, Wi-Fi, etc.).

Tool 66 may also include means, such as conventional modems or network interface controllers and associated cables or transceivers, for connecting to a remote computing device 80 through a telecommunications network 82. In this manner, additional protection may be provided for configuration data obtained from an original ECU, such as ECU 52, by permitting remote storage of an additional copy of configuration data as well as the opportunity to pre-program replacement ECUs, such as ECU 52', before installation on the vehicle. Device 80 may comprise, for example, a server (i.e., a computing device coupled to a network and configured by programming instructions (i.e. software) to provide services to other computing devices (including other servers)). Network 82 may comprise the public internet, but may also comprise a private network and may comprise a local area network (LAN), wide area network (WAN), virtual private network (VPN) or other form of telecommunications network and may further comprise an intranet or extranet.

Figure 3:
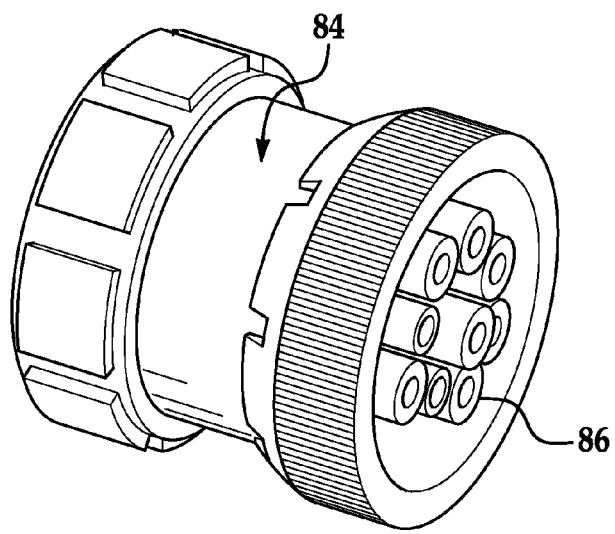
FIG. 3 is a perspective view of a tool for configuring a replacement electronic control unit for a vehicle in accordance with one embodiment of the invention.

Referring now to FIG. 3, a tool 84 for configuring a replacement electronic control unit for a vehicle—such as a replacement ECU for ECU 52—in accordance with another embodiment of the invention will be described. Like tool 66, tool 84 is provided to retrieve and store a configuration for a vehicle mounted ECU installed and configured by an OEM, such as ECU 52, and to configure a replacement ECU, such as ECU 52' in FIG. 2, using the same configuration. In the illustrated embodiment, tool 84 comprises an integrated electronics module that houses computer storage medium 70 and processes programming instructions or code (i.e. software) encoded thereon for performing the steps of a method in accordance with the invention described hereinbelow. Tool 84 is similar in size and form to the remote diagnostic unit offered for sale by Bendix Commercial Vehicle Systems LLC under the name "BENDIX RDU". Tool 84 may include a microprocessor or microcontroller having a central processing unit (CPU) in addition to housing storage medium 70 which may comprise a memory in this embodiment of the invention. Tool 84 also defines a connector (port) 86 configured to engage diagnostic connector 76.

Figure 4:
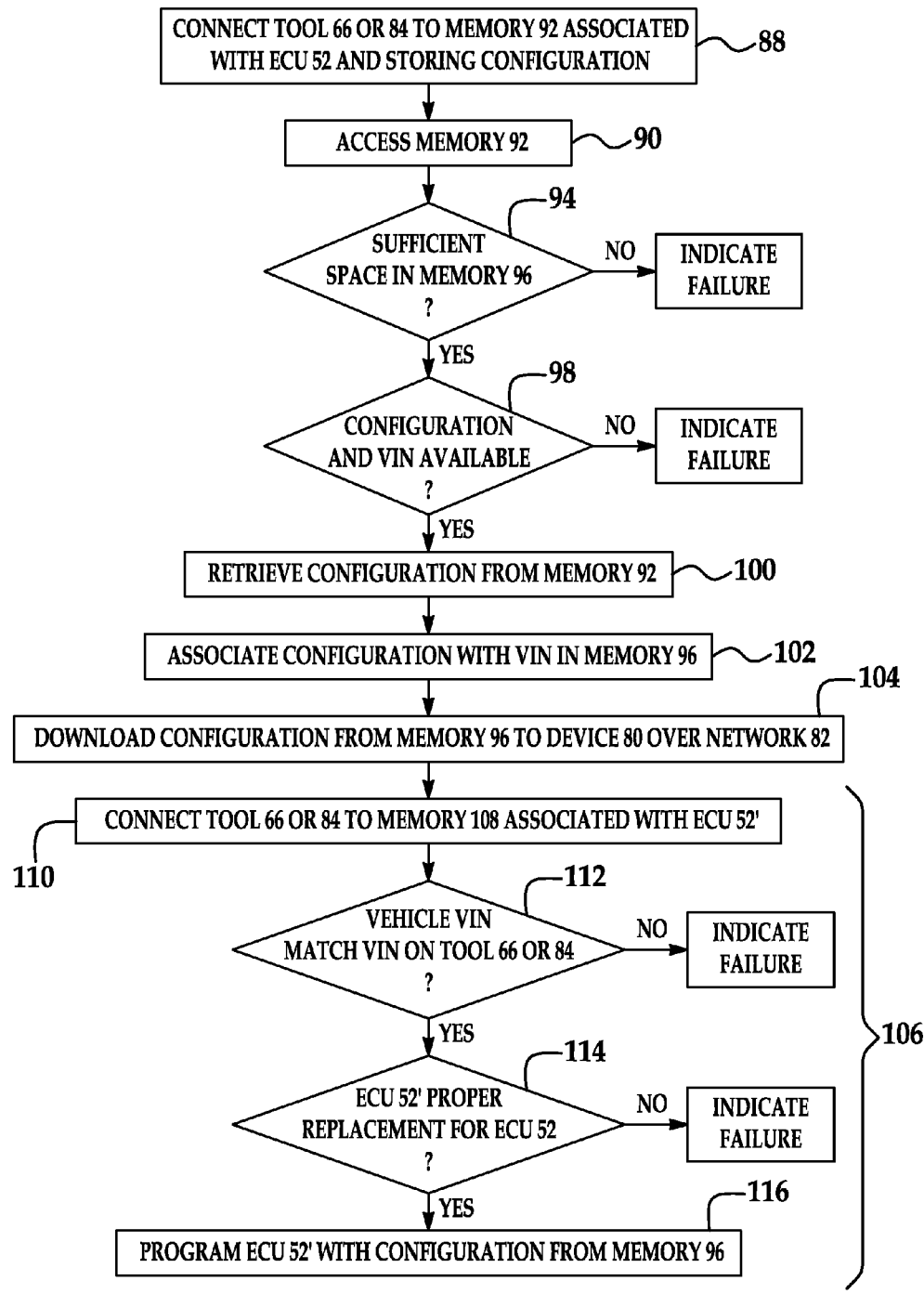
FIG. 4 is a flow chart illustrating a method for configuring a replacement electronic control unit for a vehicle in accordance with one embodiment of the invention.

Referring now to FIG. 4, a method for configuring a replacement electronic control unit for a vehicle will be described. Many steps of the method may be embodied in programming instructions or code stored on storage medium 70 and executed by processors in tools 66, 84. The method may begin with the steps 88, 90 of connecting to, and accessing, a memory 92 associated with ECU 52 on a vehicle. The memory 92 may be housed within, or local to, ECU 52 or may be separate from, or located remotely from, ECU 52 and accessible by ECU 52. Tools 66, 84 may connect to memory 92 through the vehicle diagnostic connector 76. Thereafter, tools 66, 84 access memory 92 in accordance with stored programming instructions.

The method may continue with the step 94 of determining whether a memory 96 associated with tool 66 or 84 has sufficient space to store the configuration housed in memory 92 and other data (e.g. the vehicle identification number). Memory 96 is preferably a part of, or local to, tools 66, 84, but could be remote therefrom. Memory 96 may also be a portion of storage medium 70 and information from memory 96 may be displayed on a display such as one associated with tool 66. Step 94 may include several substeps including determining the space required for storage of the configuration and other data. If tool 66 or 84 determines that there is insufficient space on memory 96 an indication may be provided to the user. The method may continue with the step 98 of determining whether the configuration and VIN are available in memory 92 and/or other memories on the vehicle. If the configuration and/or VIN are unavailable, tool 66 or 84 may again provide an indication to the user.

The method may continue with the step 100 of retrieving the configuration for ECU 52 from memory 92. The configuration for the vehicle is stored in memory 92 during assembly of the vehicle by the OEM and includes various parameter values specific to the vehicle (e.g., the length of the wheel base, turning radius, etc.). In addition to the configuration, tools 66, 84 may also retrieve the VIN from another memory on the vehicle such as a memory 101 associated with the engine ECU. Tool 66 or 84 may provide an indication to the user of the status of the retrieval of the configuration and/or VIN including an appropriate indication to the user when the retrieval is complete.

The method may continue with the step 102 of associating the configuration with the VIN associated with the vehicle in memory 96. The configuration and VIN for the vehicle may be associated in various types of data structures including, for example, a lookup table using the VIN as a header for the table. In accordance with one aspect of the invention, the method may further include the step 104 of downloading the configuration from memory 96 to device 80 over network 82. In this manner, additional safeguards for storage of the configuration data are established in the event of loss or malfunction of tools 66, 84. Tool 66 or 84 may again provide an indication to the user of the status of the downloading of the configuration to device 80 including an appropriate indication to the user when the retrieval is complete.

The method may continue with the step 106 of downloading the configuration from memory 96 to a memory 108 associated with replacement ECU 52' on the vehicle. Step 106 may include several substeps. In substep 110, tool 66 or 84 may be connected to diagnostic connector 76 as described hereinabove to provide access to memory 108 and other systems connected to, and/or forming part of, the vehicle communications systems. In substep 112, tool 66 or 84 obtains the VIN from a memory or other system component, such as memory 101 associated with the engine ECU, connected to the vehicle communication system and determines whether the VIN matches a VIN on tool 66 or 84. If the VIN obtained from the vehicle does not match any of the VINs on tool 66 or 84, an indication may be provided to the user. In substep 114, tool 66 or 84 may verify that ECU 52' is a proper replacement for ECU 52. If ECU 52' is not a proper replacement, an indication may again be provided to the user. In substep 116, ECU 52' is programmed with the configuration stored by tool 66 or 84 in memory 96. Tool 66 or 84 may again provide an indication to the user of the status of the downloading of the configuration to ECU 52' including an appropriate indication to the user when the retrieval is complete.

It should be understood that the steps of the inventive method described above may be performed on multiple vehicles such that tools 66, 84 store ECU configurations and associated VINs for a plurality of vehicles in memory 96 and, similarly, are capable of downloading configuration information to replacement ECUs 52' installed on different vehicles. Further, it should again be understood that the invention is not limited for use with the particular braking and stability control ECU 52, 52' shown in the illustrated embodiment. Rather, the invention can be used in connection with a wide variety of ECUs present in the vehicle including, for example, an antilock braking system ECU, a tire pressure monitoring ECU, an active cruise with braking (ACB) ECU or other ECUs.

A tool 66 or 84 and method in accordance with the present invention are advantageous relative to conventional methods and systems for configuring replacement electronic control units 52' in vehicles because the inventive tool 66 or 84 and method eliminate the need to obtain information from the OEM for the vehicle. As a result, replacement ECUs 52' can be installed much more quickly thereby reducing vehicle downtime and maintenance costs. The inventive tool 66 or 84 and method also provide an additional backup system for the ECU configuration that may be controlled by the vehicle owner or another party to guard against the inability or unwillingness of the OEM to provide the information. The inventive tool 66 or 84 and method are also advantageous in providing the supplier of the individual control system with control over the replacement (and resulting sales) of the electronic control unit. Tool 84 can also be used an intermediate storage device for the configuration that can be backed up to a conventional computing device such as a personal computer on which information, including configuration parameters and the VIN, may be displayed and viewed to permit confirmation of accuracy.

While the invention has been shown and described with reference to one or more particular embodiments thereof, it will be understood by those of skill in the art that various changes and modifications can be made without departing from the spirit and scope of the invention.

We claim:

1. A tool for configuring a replacement electronic control unit for a first vehicle, comprising:
  a computer storage medium having a computer program encoded thereon including code for:
    accessing a first memory associated with an original electronic control unit for said first vehicle;
    retrieving a configuration for said original electronic control unit from said first memory;
    associating said configuration with a first vehicle identification number associated with said first vehicle in a second memory remote from said first vehicle; and,
    downloading said configuration from said second memory to a third memory associated with said replacement electronic control unit for said first vehicle, said code for downloading including code for
    retrieving a second vehicle identification number from said first vehicle;
    comparing said second vehicle identification number to said first vehicle identification number; and,
    programming said replacement electronic control unit with said configuration associated with said first vehicle identification number if said second vehicle identification number equals said first vehicle identification number.

2. The tool of claim 1, further comprising an electronic module housing said computer storage medium, said module including a connector configured for connection to a communications bus of said vehicle.

3. The tool of claim 1, further comprising a computing device housing said computer storage medium, said computing device configured for connection to a communications bus of said vehicle.

4. The tool of claim 3, wherein said computing device is connected to said communications bus over a wire.

5. The tool of claim 3, wherein said computing device is connected to said communications bus over a wireless communications link.

6. The tool of claim 1, wherein said original and replacement electronic control units are configured for controlling braking of said vehicle.

7. The tool of claim 1, wherein said computer program further includes code for:
  accessing a fourth memory associated with an original electronic control unit for a second vehicle;
  retrieving a configuration for said original electronic control unit for said second vehicle from said fourth memory;
  associating said configuration for said original electronic control unit for said second vehicle with a third vehicle identification number associated with said second vehicle in said second memory remote from said second vehicle; and,
  downloading said configuration for said original electronic control unit for said second vehicle from said second memory to a fifth memory associated with said replacement electronic control unit for said second vehicle.

8. The tool of claim 1, wherein said computer program further includes code for downloading said configuration from said second memory to a server over a telecommunications network.

9. The tool of claim 1, wherein said computer program further includes code for indicating a status of execution of at least one of said retrieving and said downloading.

10. The tool of claim 1 wherein said computer program further includes code for retrieving said first vehicle identification number from said first memory.

11. The tool of claim 1 wherein said computer program further includes code for retrieving said first vehicle identification number from a fourth memory housed within said first vehicle.

12. The tool of claim 1 wherein said code for associating includes code for placing said first vehicle identification number and said configuration in a lookup table with the first vehicle identification number forming a header for said lookup table.

13. The tool of claim 1 wherein said second vehicle identification number is retrieved from said third memory.

14. The tool of claim 1 wherein said second vehicle identification number is retrieved from a fourth memory housed within said first vehicle.

15. The tool of claim 1 wherein said code for downloading said configuration includes code for verifying that said replacement electronic control unit is a proper replacement for said original electronic control unit.

16. A method for configuring a replacement electronic control unit for a first vehicle, comprising the steps of:
  accessing a first memory associated with an original electronic control unit for said first vehicle;
  retrieving a configuration for said original electronic control unit from said first memory;
  associating said configuration with a first vehicle identification number associated with said first vehicle in a second memory remote from said first vehicle; and,
  downloading said configuration from said second memory to a third memory associated with said replacement electronic control unit for said first vehicle, said downloading step including the substeps of
  retrieving a second vehicle identification number from said first vehicle;
  comparing said second vehicle identification number to said first vehicle identification number; and,
  programming said replacement electronic control unit with said configuration associated with said first vehicle identification number if said second vehicle identification number equals said first vehicle identification number.

17. The method of claim 16, wherein said original and replacement electronic control units are configured for controlling braking of said vehicle.

18. The method of claim 16, further comprising the steps of:
  accessing a fourth memory associated with an original electronic control unit for a second vehicle;
  retrieving a configuration for said original electronic control unit for said second vehicle from said fourth memory;
  associating said configuration for said original electronic control unit for said second vehicle with a third vehicle identification number associated with said second vehicle in said second memory remote from said second vehicle; and, downloading said configuration for said original electronic control unit for said second vehicle from said second memory to a fifth memory associated with said replacement electronic control unit for said second vehicle.

19. The method of claim 16, further comprising the step of connecting to said first memory through a diagnostic connector on said first vehicle.

20. The method of claim 16, further comprising the step of downloading said configuration from said second memory to a server over a telecommunications network.

21. The method of claim 16, further comprising the step of indicating a status of execution of at least one of said retrieving and said downloading steps.

22. A tool for configuring a replacement electronic control unit for a first vehicle, comprising:
- means for accessing a first memory associated with an original electronic control unit for said first vehicle;
- means for retrieving a configuration for said original electronic control unit from said first memory;
- means for associating said configuration with a first vehicle identification number associated with said first vehicle in a second memory remote from said first vehicle; and,
- means for downloading said configuration from said second memory to a third memory associated with said replacement electronic control unit for said first vehicle, said downloading means including
- means for retrieving a second vehicle identification number from said first vehicle;
- means for comparing said second vehicle identification number to said first vehicle identification number; and,
- means for programming said replacement electronic control unit with said configuration associated with said first vehicle identification number if said second vehicle identification number equals said first vehicle identification number.

23. The tool of claim 22, further comprising an electronic module housing said accessing means, said retrieving means, said associating means and said downloading means, said module including a connector configured for connection to a communications bus of said vehicle.

24. The tool of claim 22, further comprising a computing device housing accessing means, said retrieving means, said associating means and said downloading means, said computing device configured for connection to a communications bus of said vehicle.

25. The tool of claim 22, wherein said original and replacement electronic control units are configured for controlling braking of said vehicle.

26. The tool of claim 22, further comprising means for downloading said configuration from said second memory to a server over a telecommunications network.

* * * * *